United States Patent [19]

Bassler et al.

[11] Patent Number: 4,725,751
[45] Date of Patent: Feb. 16, 1988

[54] ELECTRICAL MACHINE

[75] Inventors: Rali Bassler; Hartmut Betsch, both of Bühlertal, Fed. Rep. of Germany

[73] Assignee: Robert Bosch GmbH, Stuttgart, Fed. Rep. of Germany

[21] Appl. No.: 931,691

[22] Filed: Nov. 14, 1986

Related U.S. Application Data

[63] Continuation of Ser. No. 732,008, Apr. 26, 1985, abandoned.

[30] Foreign Application Priority Data

Aug. 27, 1983 [DE] Fed. Rep. of Germany ........ 3331002

[51] Int. Cl.⁴ ............................................. H02K 3/00
[52] U.S. Cl. ..................................... 310/184; 310/43; 310/156; 310/179; 310/208
[58] Field of Search ........................... 310/198–208, 310/180, 184, 234, 43, 46, 171, 156, 179, 45; 318/521, 525; 322/63–66

[56] References Cited

U.S. PATENT DOCUMENTS

| Re. 25,244 | 9/1962 | Schumaier | 310/202 |
| 4,130,769 | 12/1978 | Karube | 310/46 |

FOREIGN PATENT DOCUMENTS

| 2511567 | 9/1976 | Fed. Rep. of Germany | 310/198 UX |
| 1531875 | 5/1968 | France | 310/46 |

Primary Examiner—R. Skudy
Attorney, Agent, or Firm—Michael J. Striker

[57] ABSTRACT

An electrical machine is suggested, in particular an electrical commutated brushless direct current motor or tacho-alternator with a preferably permanent magnetic excitation and air slot winding, wherein the individual coils of the air slot winding are subdivided into at least two partial coils (14a,b to 21a,b) and are arranged in such a manner that the subsequent partial coils (14,15,16,17,18,19,20,21) encompass the preceding partial coils at both sides from the outside in the circumferential direction uniformlly large induced voltages are obtained when switching the different partial coils in series, so that a high running quietness is obtained in the motor operation and a low fluctuation is assured in the generated voltage in the alternator operation. The fluctuation of the measuring voltage being generated by a tacho alternator is almost completely suppressed if the rotor (11) of the machine is provided with a pole retraction space (31), whereby a flattening of the crests of the sinus like induced voltages occurs in form of a trapezoidal like voltage path.

15 Claims, 6 Drawing Figures

ELECTRICAL MACHINE

This is a continuation of application Ser. No. 732,008, now abandoned, filed Apr. 26, 1985.

BACKGROUND OF THE INVENTION

The invention is based on an electrical machine, in particular a brushless direct current motor or tacho-alternator in accordance with the type of the main claim. Such an electrical machine with a winding which is disposed in the air slot is known from DE-OS No. 25 11 567. In this described three phase arrangement, each phase of the winding is provided with at least two preformed coils which are equally distributed over the stator and are substantially uniformly designed and arranged in such a manner that in the circumferential direction, the head of the subsequent coil and phase is disposed above the preceding coil at the crossing point of the coil heads. A more uniform current distribution in the individual phases of the winding is obtained with such an overlapping winding arrangement than with a customary arrangement, in which the preformed coils are arranged in series in the circumferential direction. However, irregularities remain in the path of the induced voltage, which is particularly noticeable in a very disadvantageous manner during high rotational speeds or when using the induced voltage for measuring purposes in tacho-alternators. These fluctuations of the induced voltage and the current are substantially caused when the individual coil halves are penetrated by different flows due to their different distances with respect to the magnetic poles, so that the coil halves which are disposed closer to the magnetic poles have a higher induced voltage. When switching from one coil to another fluctuations and jumps occur in the picked up voltage of an alternator which should be eliminated.

SUMMARY OF THE INVENTION

The electrical machine with the characterizing features of the main claim is advantageous in that a substantial reduction of the fluctuation of the induced voltage is achieved with simple technical switch means and constructoion measures. A uniform current distribution occurs in the individual phases of of the windings so that the aforementioned described difficulties with respect to high rotational motor speeds or when generating a measuring voltage practically no longer occur.

Advantageous further embodiments and improvements of the electrical machine are made possible when each coil is separated into at least two partial coils which are designed symmetrically with respect to the center line of the winding. Preferably the coils, which are successively adjacent to each other, are disposed in an overlapping manner in such a way that the successive partial coils encompass the preceding coils at both sides from the outside in the circumferential direction in the crossing area of the coil heads and that in the other circumferential direction the subsequent partial coils are disposed within the preceding partial coils. An optimum symmetry and a minimum of differences with respect to the height of the individual voltage in the different coils is obtained with such an arrangement.

Particularly advantageous is the separation of each coil into two substantially uniform partial coils with the same number of windings, whereby a evenly high voltage is induced at all locations of the total coil in the circumferential direction. For obtaining soft transmissions during switching over from one phase to the next, it is also feasable to slightly offset the beginnings and the ends of the partial coils in the circumferential direction of the winding. In an individual case different windings may also bring advantages if, for example, particular flow paths must be equalized in the induced voltage caused by the shape of the magnetic poles.

Particularly simple conditions during the assembly of the machine are available by using preferably identical partial coils which all have the same coil width and advantageously the same number of windings, since uniform prefabricated partial coils may be used for all coils and phases of the total winding. A particularly advantageous and simple structure is obtained if a four pole design of the rotor is used with four poles per pair of poles, which are successively switchable in circumferential direction in a range of 45° each. A four pole machine is unproblematic in its structure and manufacturing and still permits the generation permits the generation of a uniform induced voltage and a uniform current distribution in the individual phases of the winding with an electronic commutation.

The advantages of a four pole, four phase design are that an economically feasible and completely functional design is realized. An increased phase number would rsult in an increased effort in winding, a smaller phase number would influence the uniformity of the induced voltage. Furthermore, in a four phase design, always two phases may be bifilar wound and the two other phases may be geometrically offset by about 45°. A four phase winding is realized by the bifilar winding design due to the winding effect of a two phase winding.

A particularly advantageous embodiment of the electrical machine of the invention consists of providing the magnetic pole with a pole retraction so as to create an increasing air slot width to the center of the pole for obtaining a flattened voltage curve having a path similar to the trapezoidal like shape. An almost complete uniformity of the induced voltage (trapezoidal shape) is obtained in that the magnetic poles are so structured that a pole retraction causes an air slot expansion over the circumference of its pole. By a corresponding dimensioning of the pole retraction it is possible to achieve a constant induced (trapezoidal like) voltage in the range of the voltage maximum, instead of a sinus like induced voltage by flattening the sinus like current.

BRIEF DESCRIPTION OF THE DRAWINGS

One exemplified embodiment of the invention is illustrated in the drawing and explained in more detail in the following description.

DESCRIPTION OF THE PREFERRED EMBODIMENT

Figure 1:
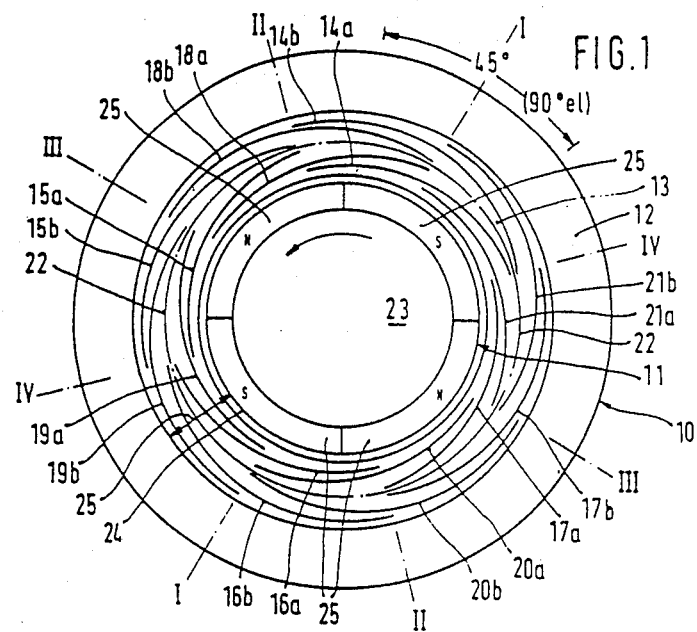
FIG. 1 illustrates a section through the electrical machine in a schematic illustration, FIG. 2 an exemplified embodiment of the winding diagram, FIGS. 3a and b oblique arrangements of the magnet poles and the coils, FIG. 4 a rotor with pole retraction and, FIG. 5 the path of the induced voltage of a tacho-alternator constructed in accordance with the invention.

By way of example, FIG. 1 illustrates an internal rotary device of an electrical machine in accordance with the invention with a stator 10 and a rotor 11. The stator 10 is provided with a stator sheet metal block 12 as a magnetic ground part on the inner wall of which a coil receiver 13 is mounted. Bifilar wound partial coils 14a,b,15a,b,16a,b and 17a,b of the first and the third winding strand are inserted into the coil receiver. Since the exemplified embodiment is a four pole machine design the winding is supplemented by partial coils 18a,b,19a,b,20a,b and 21a,b for the second and fourth winding strand which are spatially offset by about 45°. The winding is designed for four phases, so that, per phase or winding strand, four coils with two partial coils each are present, which are switchable successively in the circumferential direction in a range of 45° (90° electric) by means of an electronic cummutation device, not shown.

As depicted in FIG. 1, two adjacent partial coils of one phase (e.g. 14a and 15a) circumferentially nest between them a partial coil of another phase (e.g. 18a). Thus, the partial coil of another phase (i.e. 18a) is circumferentially inserted between the two adjacent partial coils of the one phase (i.e. 14a and 15a).

Figure 2:
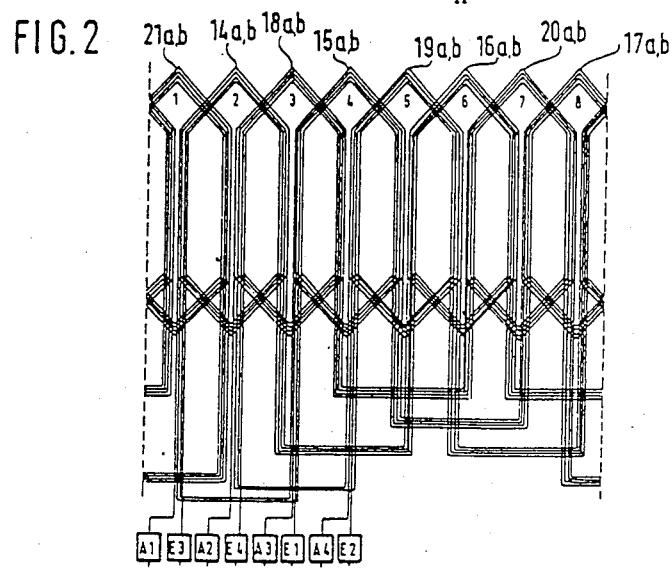

FIG. 2 illustrates a possible connection direction of the partial coils. Taking into consideration the direction of the winding, the eight partial coils of a phase are connected in series. The bifilar winding can be seen from FIG. 2. The phase between A1 and E1 and the phase between A3 and E3 are wound together and are then connected in the opposite direction, the same holds true for the phases A2 to E2 and A4 to E4.

Figure 4:
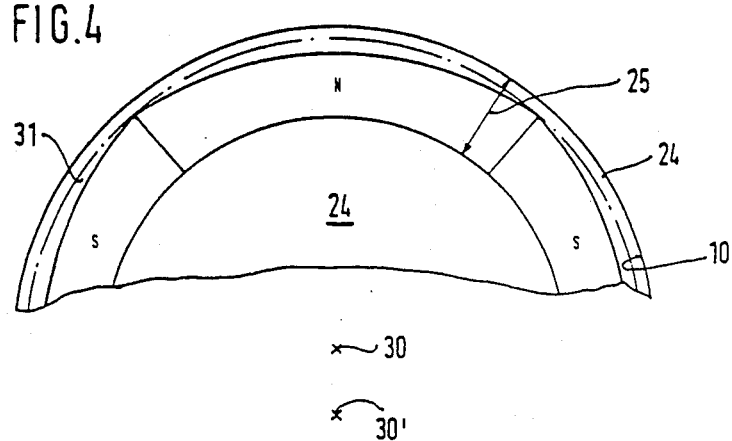

In the illustrated exemplified embodiment the rotor 11 of the electrical machine consists of a core 23 which may be designed unitary with a shaft, not shown. Four magnet segments 26 are bonded on the core 23 directly adjacent with each other or with a slight distance within respect to each other, which are magnetised in a radial direction and alternately form two north poles and two south poles. In accordance with FIG. 4, the magnets have a somewhat lesser thickness in the center of the magnets, thus providing a pole retraction in the center of the magnet. A chord like retraction with a noncircular magnet curvature, as well as a retraction by means of offsetting of the two center points 30,30' with correspondingly enlarged curvature radius of the magnets, is possible. Such an arrangement is particularly suitable for a brushless direct current machine operable with high rotational speeds and electronically commutatable. The arrangement could also be such that sheet metal pole shoes are provided, whereby the permanent magnets are mounted on the shanks thereof or between their shanks. The rotor may also be provided with a winding, instead of the permanent magnetic excitation.

The illustrated machine is constructed in such a manner that almost the total air slot 25 is filled by the winding. Thereby, only a slight slot 24' remains as a free space between the stator 10 and the rotor 11, while the remainder of the air slot receives the coil receiver 13 with the individual coils. The partial coils 14a,b to 21a,b are inserted in the coil receiver 13 symmetrically with respect to only one common circumferential center line 22 in such a manner that one starts with the inner position, for example, at the innermost end of partial coil 14a. From there the partial coils 18a,15a,19a etc., are progressively inserted counterclockwise by always 45°. For inserting the last partial coil 21a the rear portion of the partial coil 14a must be lifted, so that the partial coil 21a with its front half can be positioned below the rear half of partial coil 14a. In this manner it is achieved that all coils are inserted symmetrically with one upper positioned and one lower positioned coil half. Subsequently the outer partial coils 14b to 21b are inserted starting, for example, with the inner disposed coil side of the partial coils 14b. The partial coils 21b,17b,20b etc., are mounted thereon in clockwise direction and the end of the last partial coil is inserted beneath the beginning of partial coil 14b. In the exemplified embodiment the partial coils 14a,b to 21a,b are uniformly designed with the same coil width and also have the same number of windings. They are disposed on the coil receiver 13 in such a manner that the associated partial coils can be connected in series.

As described, each pair of partial coils of one phase (e.g. 14a,b) is circumferentially inserted or nested between two immediately adjacent pairs of partial coils of different phases (e.g. 18a,b and 21a,b), thereby constituting means to reduce a fluctuation of the induced voltage received in the winding.

The coil receiver 13 which acts as a support for the winding consists of plastic. The coil receiver 13 is made of an electrically nonconductive material, preferably a diamagnetic material. After the insertion of the partial coils 14a,b to 21a,b it, is imbedded into casting resin or plastic together with the stator 10, so that the stator 10 forms a mechanical unit 27 together with the windings, without teeth being present on stator 10.

On the other hand, it is also possible to dispose the partial coils 14a,b to 21a,b in grooves of stator 10, whereby the grooves act not for feeding the magnetic flow but merely act for receiving the preformed coils since the teeth of the stator enable a high degree of heating in a motor with high rotational speeds due to a strong remagnetisation or iron loss, but would cause a distortion of the induced voltage in a tacho-alternator in view of energy differences in the magnetic circle between tooth and groove.

Figure 5:
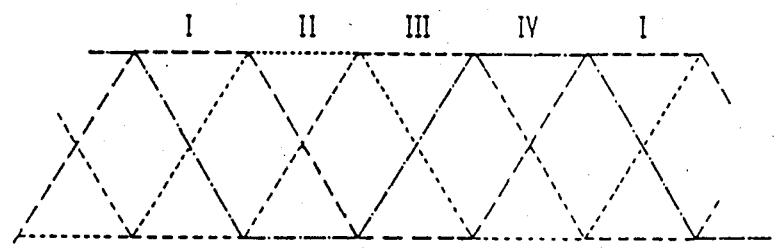

FIG. 5 illustrates the path of the voltages induced in the partial coils 14a,b to 21a,b when designing the electrical machine in accordance with the invention as a tacho-alternator with an enlarged air slot 24',31 in the circumferential direction over the magnetic poles for controlling an electronic commutated brushless direct current. The machine has four phases, whereby each phase is switched on, for example, by inductive or optoelectronic transmitters or by Hall transmitters at an angle of 45° (90° electric). The control of the different partial coils is performed in the manner that the transmitters or the parts thereof being moved with the rotor indicate the position of the rotor and therefore determine the switching on of the given partial coil. The arrangement is designed by the shaping of the magnet segments or by the corresponding design of the pole shoes with the assistance of a pole retraction in accordance with FIG. 4, that an almost accurate trapezoidal like induced voltage is obtained in the individual partial coils. Due to the symmetric arrangement of the partial coils with respect to the center line 22 a uniformly large induced voltage is obtained because of the compensation of the different distances of the coil conductor to the magnetic poles in all sectors of the stator, whereby the associated partial coils are switched on in an angle of 45° (90° electric); this range corresponds almost to the uniform maximum of the induced voltages (I-IV) in the corresponding partial coils defined by the geometry of the winding and the magnets. A complete symmetric arrangement is obtained by the inner and outer uniform overlapping of the individual partial coils which assure the necessary uniformity of the induced voltages. The duration of switching on of phase I is illustrated in FIG. 1 at an angle of 45° (90° electric), the same duration of switching on holds true for the three remainder of the phases, so that the electronic commutation always occurs at that moment at which the voltage drop occurs on the preceding phase. The illustration of FIG. 5 is idealized, however it essentially reflects the path of the following voltages.

With respect to the design of the machine it should be mentioned that instead of the illustrated inner operating machine the type of structure of an outer operating machine or a disc operating machine may be selected. Basically, no other conditions prevail.

A good operating quietness up to the highest rotational speeds is obtained when operating as a direct current motor due to the inventive design of the electrical machine, in particular with a brushless design with electronic commutation; when operating as an alternator, in particular as a tacho-alternator, the fluctuation of the measuring voltage is practically completely suppressed. The symmetric winding arrangement illustrated in FIG. 1, whereby the subsequent partial coils encompass the preceding partial coils from the outside in one circumferential direction in the crossing range of the coil heads and whereby the subsequent partial coils are disposed within the preceding coils in the other circumferential direction is particularly suitable for windings which are mounted in the air slot, because at this place the individual winding strands are more sensitive against different leakage fluxes. They cause differently induced voltages at different locations in the air slot, i.e., in different superimposed coils which cause the fluctuations. In order to eliminate the differences in the induced voltages and to exclude the different flow interlinking, the subdivision of the coils in accordance with the invention had been performed, whereby this subdivision may be performed singly or in a multiple and that the partial coils are subsequently switched in series. Differences for right or left running are practically excluded.

A winding arrangement is feasable which disregards the overlapping of the coils and instead places the individual coils adjacent to each other, if there is a low requirement for uniformity of the induced voltages. An inventive function of the winding is also assured by a subdivision of the coils into partial coils. Basically no other conditions prevail if, for example, partial coils 14a,b;15a,b;16a,b and 17a,b are disposed symmetrically to the center line 22 at both sides outside of partial coils 18a,b;19a,b;20a,b and 21a,b.

A further possibilty is provided for an advantageous winding arrangement with also substantially uniform voltage path when the coils partially overlap. The mounting of the partial coils could be performed in such a manner that at first the lower partial coils 15a and 17a are inserted into the coil receiver 13 and on top of it the lower partial coils 18a and 19a or 20a and 21a are mounted in both circumferential directions. In a corresponding arrangement the upper partial coils 16b and 17b must be mounted, whereby again the upper partial coils 18b and 19b or 20b and 21b are mounted in both circumferential directions. With this partially overlapping arrangement the partial coils may then be successively inserted into grooves of coil receiver 13 with both coil sides.

Figure 3:
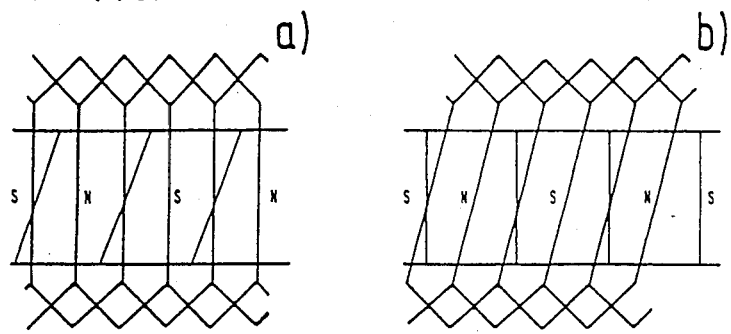

A further possibility of the winding arrangement is a structure wherein the coils are obliquely disposed with respect to the longitudinal axis or straight coils and magnetic poles which are oblique with respect to the longitudinal axis as illustrated in FIGS. 3a and b. Basically no other conditions prevail with respect to the induced voltages, however the machine has the known advantages of an oblique winding.

In one circumferential direction, subsequent partial coils can be arranged to engage preceding partial coils from the outer side of both sides of the preceding partial coils in the crossing range of the coil heads. Subsequent partial coils are also disposed within the preceding partial coils in the other circumferential direction.

In another embodiment, each coil can be subdivided into two substantially uniform partial coils (14a,b to 21a,b) with the same number of windings.

In an additional embodiment, there is an enlargement of the air slot (24', 31) in the circumferential direction over the magnetic poles toward the pole center in such a manner that a trapezoidal-like induced voltage, shown in FIG. 5, results over a constant amount of flow interlinking the coils.

What is claimed is:

1. An electrical machine comprising:
   a rotor having a outer radial side and a central area;
   a plurality of magnets secured to said side;
   a stator surrounding said plurality of magnets so as to form an air slot therebetween;
   a multiphase winding having a plurality of adjacent coils arranged between said rotor and said stator circumferentially, each of said coils having a phase different from that of said coils immediately adjacent thereto, each of said coils constituting two partial coils arranged radially apart from each other so that only one common circumferential center line is passable circumferentially between said two partial coils of all of said adjacent coils, said winding being formed to receive an induced voltage; and
   means for reducing a fluctuation of the induced voltage received by said multiphase winding and including at least two of said partial coils of one phase circumferentially nesting therebetween at least an adjacent one of said partial coils of another of said phases, said two partial coils of each of said adjacent coils being arranged symmetrically with respect to the common circumferential center line so that the induced voltage is uniform.

2. The electrical machine in accordance with claim 1, characterized in that each partial coil (14a, b to 21a, b) has a same sized coil width.

3. The electrical machine in accordance with claim 1, characterized by a four pole design of said rotor with four coils per phase which can be switched on successively in circumferential directions in a range of 45°.

4. The electrical machine in accordance with claim 1, characterized in that the partial coils (14a, b to 21a, b) are mounted on a coil receiver composed of plastic.

5. The electrical machine in accordance with claim 1, characterized in that each of said magnets have a center and two ends, said center being retracted relative to said ends so as to enlarge the air slot in the circumferential direction from said ends to said center such that a trapezoidal-like induced voltage results in said partial coils individually.

6. The electrical machine as defined in claim 1, wherein said magnets are formed as permanent magnets.

7. The electrical machine as defined in claim 1, further comprising means for supporting said multiphase winding and including an electrically nonconductive material secured to said stator and supporting said multiphase winding.

8. The electrical machine as defined in claim 7, wherein said electrically nonconductive material is also a diamagnetic material.

9. An electrical machine comprising:
a rotor having a outer radial side;
a plurality of magnets secured to said side;
a stator radially surrounding and spaced from said plurality of magnets;
a multiphase winding having a plurality of adjacent coils arranged between said rotor and said stator circumferentially, each of said coils having a phase different from that of said coils immediately adjacent thereto, each of said coils being divided into a pair of partial coils arranged radially apart from each other, said multiphase winding being formed to receive an induced voltage; and
means for reducing a fluctuation of the induced voltage received by said multiphase winding and including said pair of partial coils of one phase being circumferentially inserted between an immediately adjacent two of said pairs of partial coils of different phases.

10. The electrical machine as defined in claim 9, further comprising:
means for supporting said multiphase winding and including an electrically non-conductive material secured to said stator and supporting said multiphase winding.

11. The electrical machine as defined in claim 10, wherein said electrically nonconductive material is diamagnetic.

12. The electrical machine as defined in claim 9 wherein said stator has an inner wall facing said rotor, said multiphase winding being secured to said inner wall.

13. An electrical machine comprising:
a rotor having a outer radial side and a central area;
a plurality of magnets secured to said side, each of said magnets having a center and two ends;
a stator surrounding said plurality of magnets so as to form an air slot therebetween;
a four phase winding having a plurality of adjacent coils bifilar wound and arranged between said rotor and said stator circumferentially, each of said coils having a phase different from that of said coils immediately adjacent thereto, each of said coils constituting two partial coils arranged radially apart from each other, said winding being formed to receive an induced voltage;
means for reducing a fluctuation of the induced voltage received by said winding and including at least two of said partial coils of one phase circumferentially nesting therebetween at least an adjacent oneof said partial coils of another of said phases; and
means for making said induced voltage be trapezoidal-like in each individual one of said partial coils and including said center of each of said magnets being formed retracted relative to said ends so as to radially enlarge said air slot in a circumferential direction from said ends to said center, all of said partial coils are arranged so as to be electrically switchable successively in a circumferential direction over a range of 45° which is 90° electric.

14. The electrical machine as defined in claim 13, wherein said two partial coils of each of said adjacent coils is arranged so that only one common circumferential center line is passable circumferentially therebetween, said two partial coils of each of said adjacent coils being further arranged symmetric with respect to the common circumferential center line so that the induced voltage is uniform.

15. The electrical machine as defined in claim 9, wherein said pair of partial coils of all of said adjacent coils is arranged so that only one common circumferential center line is passable circumferentially between said pair of partial coils of all of said adjacent coils, said pair of partial coils of each of said adjacent coils being further arranged symmetrically with respect to the common circumferential center line so that the induced voltage is uniform.

* * * * *